UNITED STATES PATENT OFFICE.

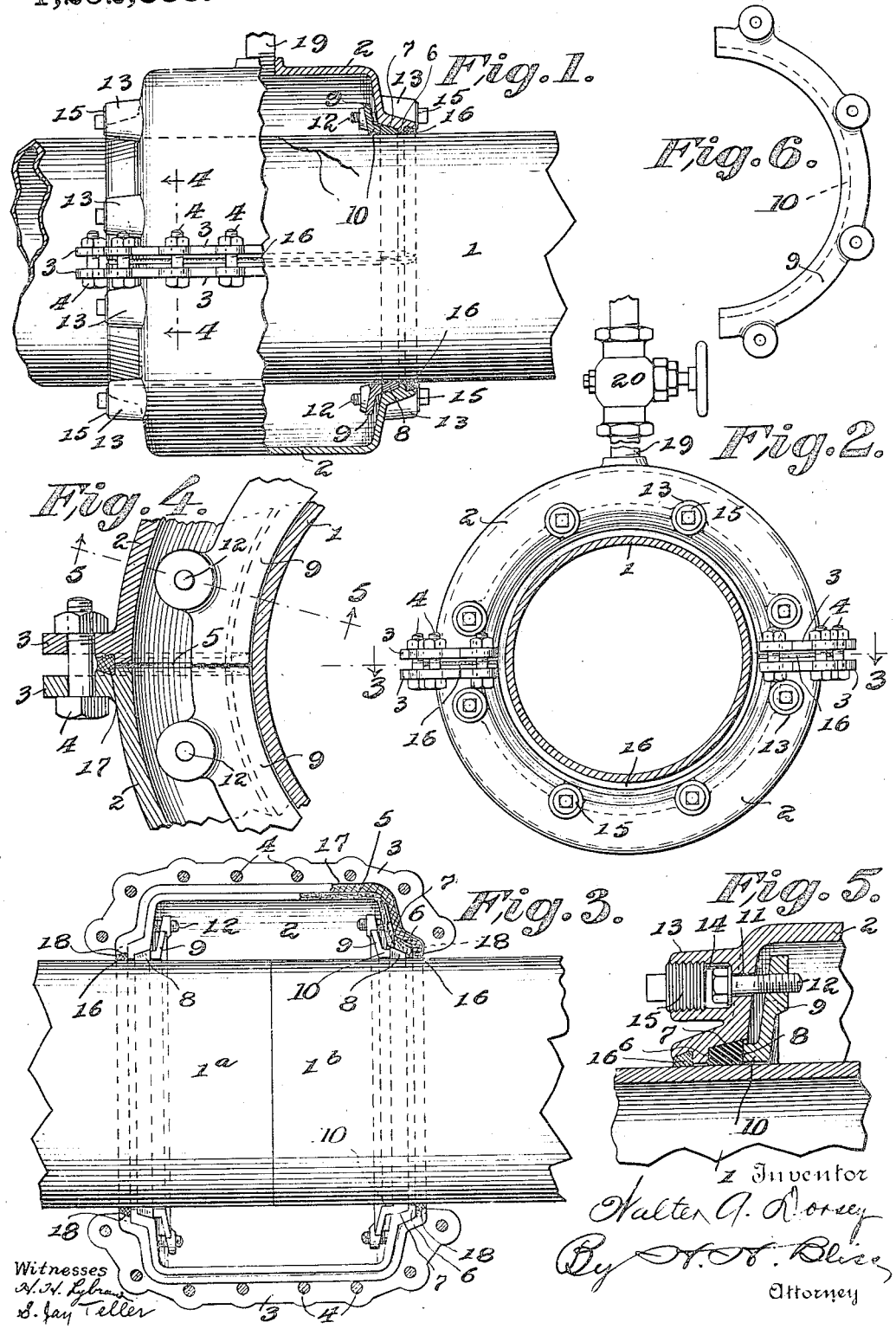

WALTER A. DORSEY, OF COLUMBUS, OHIO, ASSIGNOR TO THE BONNEY-FLOYD COMPANY, OF COLUMBUS, OHIO, A CORPORATION OF OHIO.

PIPE-COUPLING AND REPAIR-SLEEVE.

1,252,888.  Specification of Letters Patent.  Patented Jan. 8, 1918.

Application filed June 8, 1915. Serial No. 32,918.

*To all whom it may concern:*

Be it known that I, WALTER A. DORSEY, a citizen of the United States, residing at Columbus, in the county of Franklin and State of Ohio, have invented certain new and useful Improvements in Pipe-Couplings and Repair-Sleeves, of which the following is a specification, reference being had therein to the accompanying drawing.

The invention relates to devices for emergency use for the stopping of leaks in pipe lines without removing the broken or injured pipe section and without shutting off the pressure, or for the temporary connecting together of two externally smooth pipes. As emergency repair sleeves or couplings of this character must sometimes be used on pipes carrying very high pressures, frequently as much as four hundred pounds per square inch, it will be seen that not only must the sleeves themselves be very strong, but the means for packing must be extremely efficient and must be firmly held against being loosened or forced out by the pressure.

The object of the invention is to provide a device of this class which is simple in construction, which can be easily applied by a minimum number of men, and which is reliable and efficient in its operation.

Of the accompanying drawings which illustrate the embodiment of the invention which I now deem preferable—

Figure 1 is a side view partly in section and partly in elevation of a device embodying the invention in use on a cracked or broken pipe.

Fig. 2 is an end view of the parts shown in Fig. 1, the pipe itself being shown in section.

Fig. 3 is a sectional view taken along the line 3—3 of Fig. 2, the device being shown as connecting two sections of pipe.

Fig. 4 is a fragmentary sectional view taken along the line 4—4 of Fig. 1.

Fig. 5 is a fragmentary sectional view taken along the line 5—5 of Fig. 4.

Fig. 6 is a detail view of one of the sections of the follower ring.

Referring to the drawings 1 represents the pipe in which a leak has occurred requiring to be stopped. In Fig. 3 instead of showing a single pipe with a break therein I have shown two separate pipes 1ª and 1ᵇ. 2 represents as a whole the sleeve adapted to be placed around the pipe. Preferably, this sleeve is formed in sections, in this case two, the division planes between the sections being longitudinal ones passing through the axis, but it will be understood that under some circumstances it is not necessary to construct the sleeve in sections, as, for instance, when it is to be used only for the connecting of two separate pipes as shown in Fig. 3. At the edges of the sections there are formed flanges 3, 3, which are held together by means of the bolts 4, 4, passing through suitable apertures therein. Between the sections there are provided suitable packing strips 5 of prepared rubber or other suitable material.

The sleeve 2 is constructed at its ends to closely surround the pipe 1 and at the inner side of each end part there is formed an annular recess having an outer perpendicular wall 6 and a circumferential wall 7 which is inclined to cause the recess to taper longitudinally outward, that is, to give the recess a greater width at the inner part than at the outer part. A packing ring 8 of prepared rubber or other suitable material is provided, this ring being of such size and shape as to enter and completely fill the recess. Preferably as shown in Fig. 3 the ring is in sections, the sections corresponding to the sections of the sleeve 2, but it will be understood that as concerns the number of division points of the ring there can be variation.

For holding the packing ring 8 in place a suitable follower device is provided on the inside of the sleeve. Preferably this follower device is a ring 9 and when the sleeve 2 is made in sections, the ring is also made in sections, these sections preferably corresponding in number to the sections of the sleeve. One of the sections is shown in detail in Fig. 6. The ring 9 has a flange 10 adapted to be pressed against the packing ring 8 and means are provided for moving the ring outward with respect to the sleeve to cause the flange 10 to press the packing ring into the recess and expand it against the pipe. As shown, the sleeve 2 is provided with a series of apertures 11 through which extend bolts 12. These bolts are threaded into suitable apertures in the rings 9, the rings being formed with bosses in which the apertures are formed. It will be obvious that by turning the bolts 12 the rings 9 can be drawn outward to press against the packing rings 8 as set forth above.

In order to prevent leakage outward through the apertures 11 there is formed around each aperture a boss 13 having a recess 14 which receives the head of the corresponding bolt 12. The walls of the recesses 14 are threaded and plugs 15 are screwed into the recesses to tightly close them.

It will be understood that normally the packings 5 and 8 of rubber or other resilient material would withstand the pressure in the interior of the sleeve, but as an additional precaution against leakage, especially after the deterioration of the packings 5 and 8, I also provide a supplemental packing of lead or other easily fusible metal. Around the outer edges of the end parts of the sleeve there are provided longitudinally outward tapering annular recesses, and these recesses are filled with calking metal, such as filamentary lead, in the well known manner to form the supplemental packing ring 16. Similar recesses are formed along the sides of the sleeve sections held adjacent the packings 5, and these side recesses are filled with calking metal in the same way to form the supplemental packing strips 17. Preferably the recesses in the sides of the sleeve and in the ends of the sleeve are so arranged as to join each other as indicated at 18 in Fig. 3. With the recesses arranged in this way the lead packing can be continuous and integral throughout.

Preferably in order to temporarily take care of the leakage from the pipe 1 while the repair device is being put in place a pipe 19 is provided having a valve 20. The valve 20 can be left opened while the device is being put on and then the valve 20 can be closed thus finally stopping the flow of fluid from the leak.

The manner of using the device will be apparent from the foregoing description. The follower rings 9 are loosely connected with the sleeve and the packing rings 8 are loosely inserted in the recesses provided for them. With the sleeve in position on the pipe the bolts 12, 12 are tightened to draw the follower rings outward and compress the packing rings 8, 8. After that the plugs 15, 15 are screwed in to stop the leakage around the bolts. Finally the lead packing is poured in. When the several parts are formed in sections as shown, each section of the follower is loosely connected to the corresponding section of the sleeve, and the corresponding section of the packing ring is inserted. One of the composite sections thus formed is put in place on the pipe and the packing strips 5, 5 are laid in position. Then the other composite section is put in place on the pipe and the two sections are clamped together by means of the bolts 4, 4, thus compressing the packing strips 5, 5. After that the bolts 12, 12 are tightened and the other steps taken as outlined above.

What I claim is:

1. The combination of a pipe-engaging sleeve provided at each end with two separated annular recesses immediately adjacent the pipe, the inner of the recesses tapering longitudinally outward, a yieldable packing ring fitted in the inner of the said recesses, follower devices in the sleeve movable longitudinally outward to force the packing rings into firm engagement with the pipe and the walls of the recesses, and metallic packing in the outer of the said recesses engaging the pipe.

2. The combination of a longitudinally divided sectional pipe-engaging sleeve provided at each end with two separated annular recesses immediately adjacent the pipe, the inner of the recesses tapering longitudinally outward, a yieldable packing ring fitted in the inner of the said recesses, follower devices in the sleeve movable longitudinally outward to force the packing rings into firm engagement with the pipe and the walls of the recesses, and a metallic packing in the outer of the said recesses engaging the pipe.

3. The combination of a longitudinally divided sectional pipe-engaging sleeve provided at each end with two separated annular recesses immediately adjacent the pipe, and provided at both sides with recesses extending along the division planes and joining at their ends the outer of the said end recesses, the inner of the said end recesses tapering longitudinally outward, a yieldable packing ring fitted in the inner of the said end recesses, follower devices in the sleeve movable longitudinally outward to force the packing rings into firm engagement with the pipe and the walls of the recesses, and a fusible metallic packing in the said side recesses and the outer of the said end recesses engaging the pipe.

4. The combination of a pipe-engaging sleeve provided at its ends with annular recesses immediately adjacent the pipe, a yieldable packing ring fitted in each of the recesses, longitudinally movable follower rings in the sleeve adjacent the packing rings, bolts extending through apertures in the end walls of the sleeve and engaging the follower rings to move the rings outward to force the packing rings into firm engagement with the pipe and the walls of the recesses, bosses formed on the sleeve with recesses therein to receive the heads of the bolts, and plugs for closing the outer ends of the recesses to prevent leakage around the bolts.

In testimony whereof I affix my signature in presence of two witnesses.

WALTER A. DORSEY.

Witnesses:
HARRY S. RANSOM,
HARRY E. WEST.